US012566638B2

(12) United States Patent
Wang et al.

(10) Patent No.: US 12,566,638 B2
(45) Date of Patent: Mar. 3, 2026

(54) CONTAINER RESOURCE AUTOSCALING BY CONTROL PLANE

(71) Applicant: International Business Machines Corporation, Armonk, NY (US)

(72) Inventors: Chen Wang, Chappaqua, NY (US); Huamin Chen, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 18/050,166

(22) Filed: Oct. 27, 2022

(65) Prior Publication Data

US 2024/0143407 A1 May 2, 2024

(51) Int. Cl.
*G06F 9/46* (2006.01)
*G06F 9/50* (2006.01)

(52) U.S. Cl.
CPC .......... *G06F 9/5044* (2013.01); *G06F 9/5038* (2013.01); *G06F 9/505* (2013.01)

(58) Field of Classification Search
CPC ....... G06F 9/5044; G06F 9/5038; G06F 9/505
See application file for complete search history.

(56) References Cited

U.S. PATENT DOCUMENTS

| | | | |
|---|---|---|---|
| 10,498,857 | B2 | 12/2019 | Thompson et al. |
| 11,102,282 | B2 | 8/2021 | Chatt et al. |
| 2021/0392185 | A1 | 12/2021 | Einkauf et al. |
| 2022/0027217 | A1 | 1/2022 | Thoemmes et al. |

OTHER PUBLICATIONS

"Automatically adjust pod resource levels with the vertical pod autoscaler", Red Hat Inc., retrieved date of Apr. 7, 2022, 26 pages.
Nguyen et al., "Horizontal Pod Autoscaling in Kubernetes for Elastic Container Orchestration", Sensors, MDPI, Aug. 17, 2020, 18 pages.
Oracle Cloud Infastructure Documentation, "Using the Kubernetes Vertical Pod Autoscaler", 2022, 8 pages.
Haider, H., "Kubernetes Autoscaling in Production: Best Practices for Cluster Autoscaler, HPA and VPA", Dec. 5, 2019, 15 pages.

*Primary Examiner* — Gregory A Kessler
(74) *Attorney, Agent, or Firm* — Cantor Colburn LLP; Rakesh Roy

(57) ABSTRACT

Embodiments relate to container resource autoscaling by a control plane. According to an aspect, a computer-implemented method includes receiving and intercepting a request from a software application by a proxy, the request for a service provided by a backend service of one or more control plane components. A processing device of the proxy determines, based on the intercepted request, an amount of resources to be assigned to or updated in the backend service. The processing device causes a control plane scaler coupled to the one or more control plane components to request the determined amount of resources for the backend service. Upon receiving a confirmation that the determined amount of resources is available in the backend service, the processing device forwards from the proxy, the intercepted request to the backend service.

20 Claims, 6 Drawing Sheets

500

RECEIVE AND INTERCEPT A REQUEST FROM A SOFTWARE APPLICATION BY A PROXY, THE REQUEST FOR A SERVICE PROVIDED BY A BACKEND SERVICE OF ONE OR MORE CONTROL PLANE COMPONENTS 510

DETERMINE, BY A PROCESSING DEVICE OF THE PROXY BASED ON THE INTERCEPTED REQUEST, AN AMOUNT OF RESOURCES TO BE ASSIGNED TO OR UPDATED IN THE BACKEND SERVICE 520

CAUSE, BY THE PROCESSING DEVICE, A CONTROL PLANE SCALER COUPLED TO THE ONE OR MORE CONTROL PLANE COMPONENTS TO REQUEST THE DETERMINED AMOUNT OF RESOURCES FOR THE BACKEND SERVICE 530

UPON RECEIVING A CONFIRMATION THAT THE DETERMINED AMOUNT OF RESOURCES IS AVAILABLE IN THE BACKEND SERVICE, FORWARD, BY THE PROCESSING DEVICE FROM THE PROXY, THE INTERCEPTED REQUEST TO THE BACKEND SERVICE 540

Figure 5:
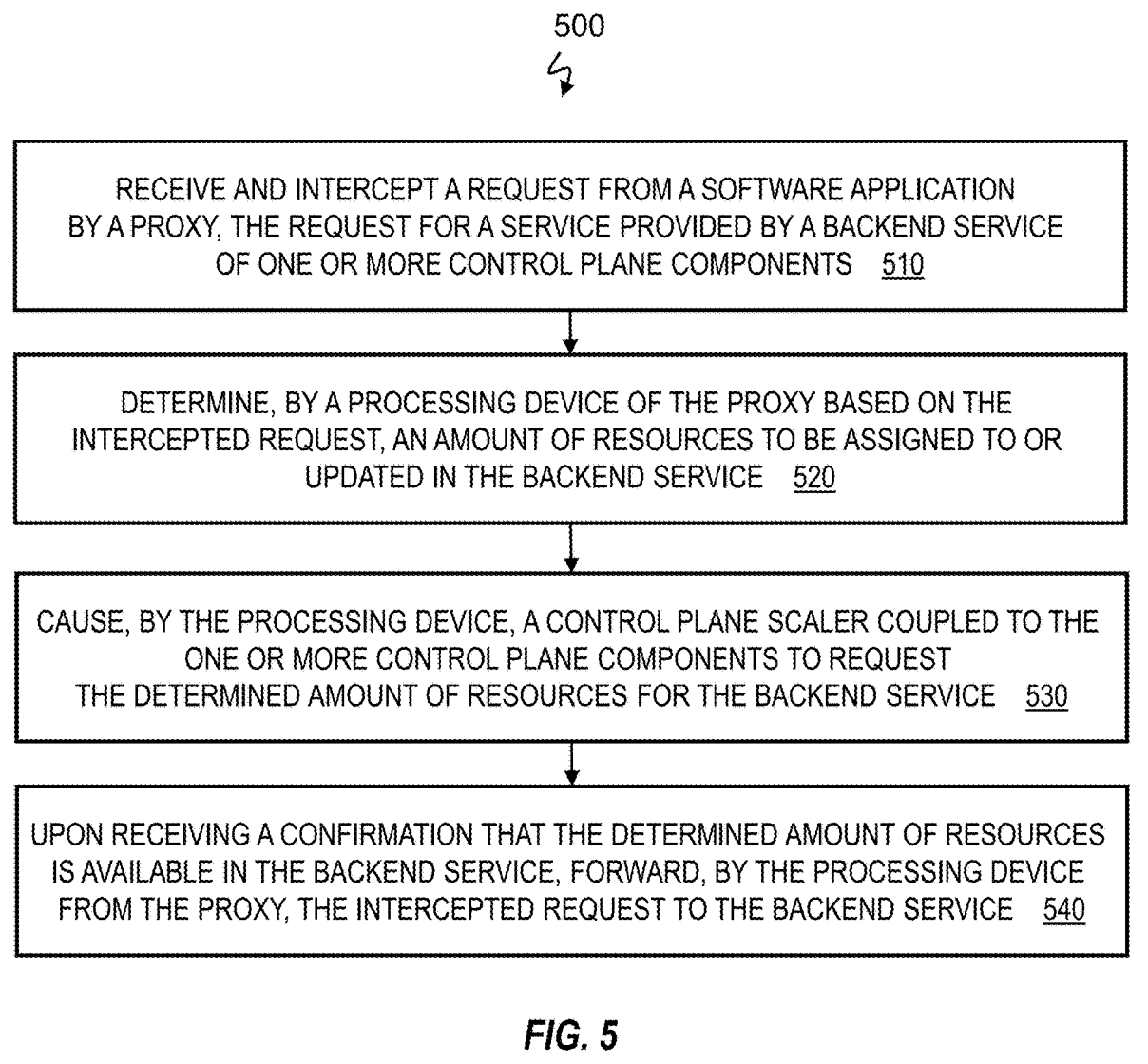

500

RECEIVE AND INTERCEPT A REQUEST FROM A SOFTWARE APPLICATION BY A PROXY, THE REQUEST FOR A SERVICE PROVIDED BY A BACKEND SERVICE OF ONE OR MORE CONTROL PLANE COMPONENTS   510

DETERMINE, BY A PROCESSING DEVICE OF THE PROXY BASED ON THE INTERCEPTED REQUEST, AN AMOUNT OF RESOURCES TO BE ASSIGNED TO OR UPDATED IN THE BACKEND SERVICE   520

CAUSE, BY THE PROCESSING DEVICE, A CONTROL PLANE SCALER COUPLED TO THE ONE OR MORE CONTROL PLANE COMPONENTS TO REQUEST THE DETERMINED AMOUNT OF RESOURCES FOR THE BACKEND SERVICE   530

UPON RECEIVING A CONFIRMATION THAT THE DETERMINED AMOUNT OF RESOURCES IS AVAILABLE IN THE BACKEND SERVICE, FORWARD, BY THE PROCESSING DEVICE FROM THE PROXY, THE INTERCEPTED REQUEST TO THE BACKEND SERVICE   540

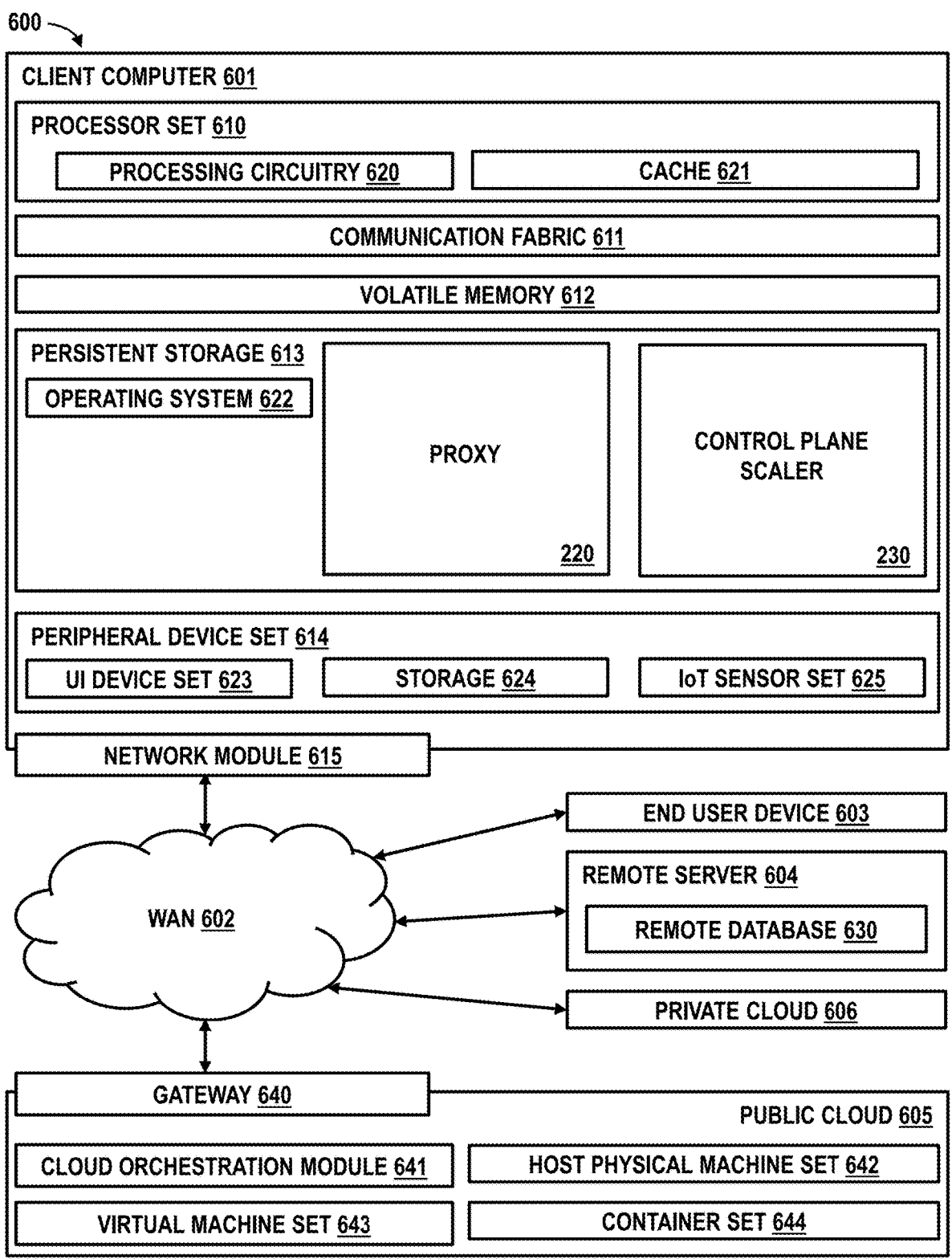

CLIENT COMPUTER 601

PROCESSOR SET 610

PROCESSING CIRCUITRY 620      CACHE 621

COMMUNICATION FABRIC 611

VOLATILE MEMORY 612

PERSISTENT STORAGE 613

OPERATING SYSTEM 622

PROXY    220

CONTROL PLANE SCALER    230

PERIPHERAL DEVICE SET 614

UI DEVICE SET 623      STORAGE 624      IoT SENSOR SET 625

NETWORK MODULE 615

WAN 602

END USER DEVICE 603

REMOTE SERVER 604

REMOTE DATABASE 630

PRIVATE CLOUD 606

GATEWAY 640

PUBLIC CLOUD 605

CLOUD ORCHESTRATION MODULE 641      HOST PHYSICAL MACHINE SET 642

VIRTUAL MACHINE SET 643      CONTAINER SET 644

*FIG. 6*

CONTAINER RESOURCE AUTOSCALING BY CONTROL PLANE

BACKGROUND

The present invention generally relates to computer systems, and more specifically, to computer-implemented methods, computer systems, and computer program products configured and arranged to perform container resource autoscaling by a control plane.

A container platform provides services to organize a variety of software products, including web storage, data transfer, backup and replication, among others. For example, a container platform can include a family of containerization software products in different environments to allow users to monitor container resources and container health, manage users, work with operators, etc. Such a container platform may include a control plane of multiple control plane components, including a persistence store, an application programming interface (API), a controller manager, among others. These control plane components are powered continuously and stay alive regardless of actual workload, resulting in inefficiencies in power and resource utilization.

Attempts to avoid or reduce such inefficiencies include reducing data plane utilization (e.g., pod usage on demand) or deploying a timer-based standby or hibernation schedule. In some cases, users may pre-configure (based on expected costs or workload) resource allocation, which does not decrease even if there is no actual workload. Such attempts may not sufficiently avoid improper allocation of resources in view of actual workload demands in control plane components.

SUMMARY

Embodiments of the present invention are directed to computer-implemented methods for container resource autoscaling by a control plane. A computer-implemented method includes receiving and intercepting a request from a software application by a proxy, the request for a service provided by a backend service of one or more control plane components. A processing device of the proxy determines, based on the intercepted request, an amount of resources to be assigned to or updated in the backend service. The processing device causes a control plane scaler coupled to the one or more control plane components to request the determined amount of resources for the backend service. Upon receiving a confirmation that the determined amount of resources is available in the backend service, the processing device forwards from the proxy, the intercepted request to the backend service.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a flow diagram of a method of managing resource allocation in one or more control plane components according to one or more embodiments of the present invention; and FIG. 6 depicts a block diagram of an example computing environment for use in conjunction with one or more embodiments of the present invention.

DETAILED DESCRIPTION

Figure 1:
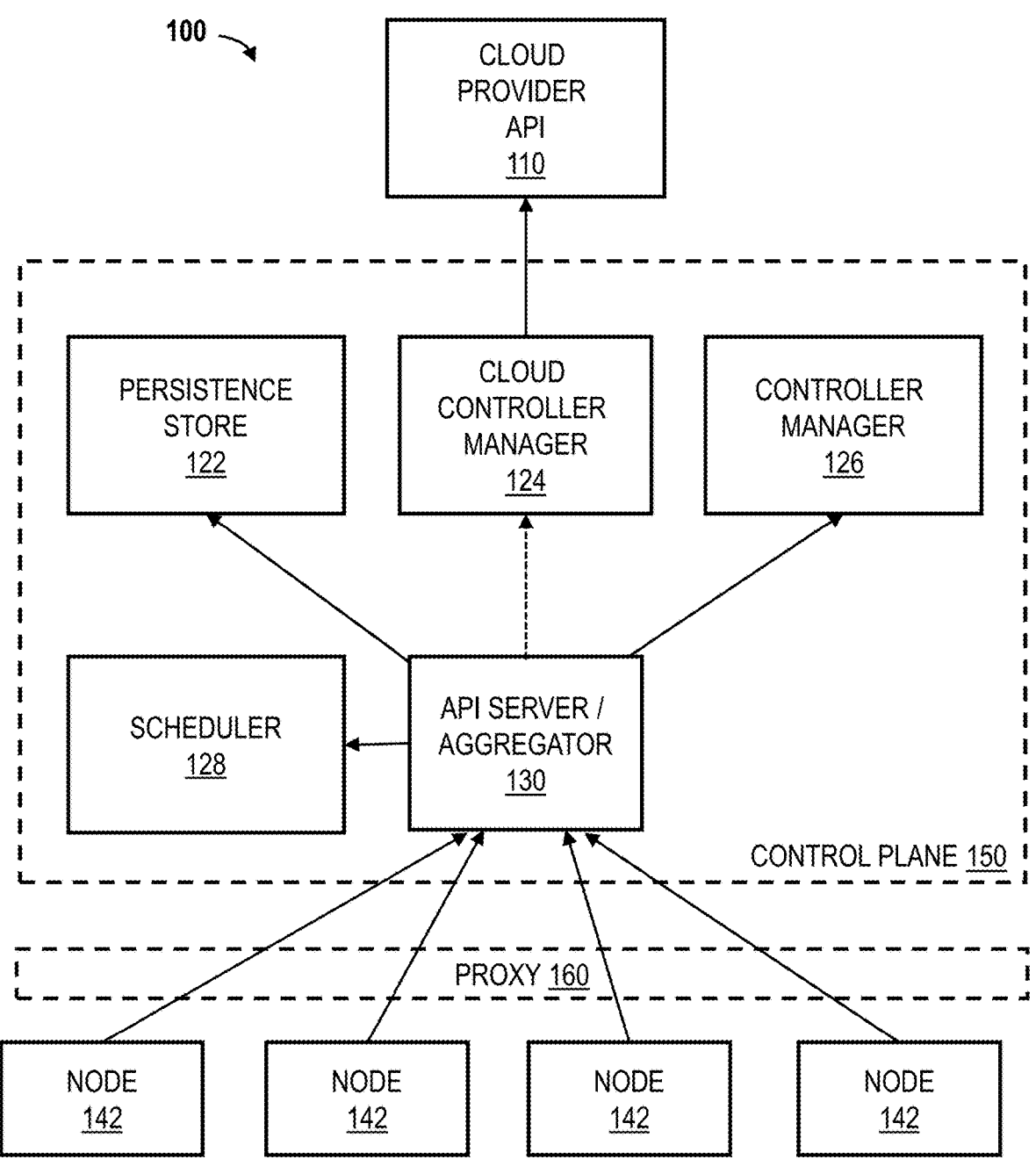
FIG. 1 depicts a high-level component diagram of an illustrative example of a deployed cluster managing multiple worker nodes according to one or more embodiments of the present invention.

Various technical benefits and technical solutions are provided by techniques, processes, devices, and systems for managing resource allocation in one or more control plane components to improve energy and resource utilization efficiency. Specifically, when there is little or no demand, some control plane components may be configured to a standby, sleep, or hibernation mode, instead of being powered on continuously with a pre-configured set of resources in existing deployments. According to aspects of the present disclosure, one or more proxies may be used to intercept application requests for backend services. Based on the interception, a control plane scaler may adjust or update various resources in the operating control plane components, including placing such components to hibernation to free up underutilized resources.

According to aspects of the present disclosure, a method for managing one or more control plane components includes receiving and intercepting a request from a software application by a proxy. The request can be for a service provided by a backend service of the one or more control plane components. A processing device of the proxy may determine, based on the intercepted request, an amount of resources to be assigned to (e.g., when waking up from standby or hibernation) or updated in the backend service. The processing device can cause a control plane scaler coupled to the one or more control plane components to request the determined amount of resources for the backend service. Upon receiving a confirmation that the determined amount of resources is available in the backend service, the processing device can forward the intercepted request to the backend service from the proxy. As such, the proxy allows for an optimal resource allocation in the one or more control plane components (including hibernation when idling is determined).

Users may rely on microservices and containers to build software applications. The applications can be delivered and scaled intelligently in a hybrid cloud environment on a container platform. A container platform can include, for instance, a platform that provides a foundation for on-premises, hybrid, and multi-cloud deployments of software applications. Such container platform provides automated operations and life-cycle management of the application deployment. For example, users of a development team may build and deploy new applications on the container platform. Users of an operations team may provision, scale, and/or manage a platform, which includes a cluster when deployed.

A cluster may include a set of nodes (e.g., worker machines) that run containerized applications (e.g., packaged with runtime, libraries, etc.). The nodes can host pods that are components of the application workload. A control plane may be used to manage the nodes and the pods in the cluster. Pods can be atomic units, i.e., smallest size of deployable units that can be created an managed within a system. In a production environment, a control plane may run across multiple computers and a cluster may run multiple nodes in order to provide fault-tolerance and availability. Control plane components, such as etcd (e.g., a persistent storage), API aggregator, and control manager, often stay alive all of the time during operation in existing deployments, regardless of actual workload demanded by the nodes. As such, these components would take the requested resource regardless of whether user workloads are running, resulting in unnecessary costs and low energy efficiency. Aspects of the present disclosure solve such shortcomings by dynamically updating the resource allocations in the control plane components, including placing them to hibernation when conditions are met, to free up resources for better use.

Because control planes often communicate through hypertext transfer protocol (HTTP) or HTTP secure (HTTPS), according to aspects of the present disclosure, a chain of HTTP proxies for each control plane component can be utilized to adjust or update resource allocations thereof, so that the control plane components are activated or in operation with proper resource allocation only upon requests. The control plane components may enter hibernation when idling is detected for an extended period of time. For example, according to aspects of the present disclosure, a HTTP or HTTPS proxy intercepts HTTP/HTTPS requests before the requests reach the backend services. The proxy may signal to a control plane scaler to activate the backend service (e.g., initiation or from hibernation). When the backend services are activated, the proxy can forward the requests to the backend services.

FIG. 1 depicts a high-level component diagram of an illustrative example of a deployed cluster 100 managing multiple worker nodes 142, 144, 146, and 148, in accordance with one or more aspects of the present disclosure. As shown, a control plane 150 interfaces between the nodes 142-148 and a cloud provider application programming interface (API) 110. The control plane 150 can include components such as a persistence store 122 (e.g., etcd), a cloud controller manager 124, a controller manager 126, a scheduler 128, and an API server and/or aggregator 130. The control plane components may make global decisions about the cluster 100 (e.g., scheduling) and detect or respond to cluster events (e.g., initiating a new pod when a deployment replica field is not satisfied). The control plane components may run on any machine (e.g., computational devices, not shown) in the cluster 100. In some cases, the control plane components may start on a common machine for simplicity purposes and may not run user containers on the common machine.

The API server 130 may include a kube-apiserver, which is a component of a control plane that exposes the API. In some cases, the API server 130 may be considered as the front end of the control plane 150 when the API server 130 forwards requests from the nodes 142-148 to the other control plane components. In some cases, the API server 130 may be considered as the back end of the control plane 150 when a proxy 160 intercepts the requests from the nodes 142-148, according to aspects of the present disclosure. In some cases, the API server 130 may scale horizontally by deploying more instances, between which traffic may be balanced. Examples of the proxy 160 are further discussed in relation to the proxies 220, 222, and 224 in FIG. 2.

The persistence store 122 may include an etcd, which is a consistent and highly-available key value store used as a backing store for cluster data. The scheduler 128 may include a kube-scheduler, which is a control plane component watching for newly created pods with no assigned node. The scheduler 128 may select a node for the pods to run on. The scheduler 128 may consider various factors for scheduling decisions, including: individual and collective resource requirements, hardware/software/policy constraints, affinity and anti-affinity specifications, data locality, inter-workload interference, and/or deadlines, among others.

The controller manager 126 may include a kube-controller-manager, which runs controller processes. The controller manager 126 may include a node controller for noticing and responding when nodes become unavailable. The controller manager 126 can include a job controller that watches for job objects that represent tasks and creates pods to complete the tasks. The controller manager 126 can include an endpoints controller for populating end point objects for joining services and/or pods. The controller manager 126 may also include service account and token controllers for creating default accounts and API access tokens for new namespaces.

The cloud controller manager 124 may be a control plane 150 component that embeds cloud-specific control logic. As shown in the example of FIG. 1, the cloud controller manager 124 can link the cluster 100 into the cloud provider API 110. The cloud controller manager 124 may run controllers that are specific to the cloud provider. The cloud controller manager 124 may be optional and not required when the cluster 100 is running on local premises, or in a learning environment inside of one machine.

The controller manager 126 and the cloud controller manager 124 may respectively combine several logically independent control loops into a single binary unit running as a single process. Both may be scaled horizontally (e.g., run in multiple copies in parallel) to improve performance or to help tolerate failures.

The nodes 142-148 may respectively include node components (not shown) that run pods and provide a runtime environment. For example, each of the nodes 142-148 may include an agent (e.g., kubelet) that makes sure that containers are running in a pod. An agent may take a set of pod specifications (e.g., PodSpecs) that are provided through various mechanisms and ensures that the containers described in the pod specifications are running and healthy. Each of the nodes 142-148 may include a network proxy (e.g., kube-proxy) to implement part of a service concept. For example, the network proxy may maintain network rules on the nodes 142-148. The network rules can enable network communications to pods from network sessions inside or outside of the cluster 100. The nodes 142-148 may each include additional components, such as a container runtime, addons such as a domain name server (DNS) and web user interface (UI), etc. For example, a container runtime may be responsible for running containers. Addons may use resources (e.g., DaemonSet, Deployment, etc.) to implement cluster features.

5

Figure 2:
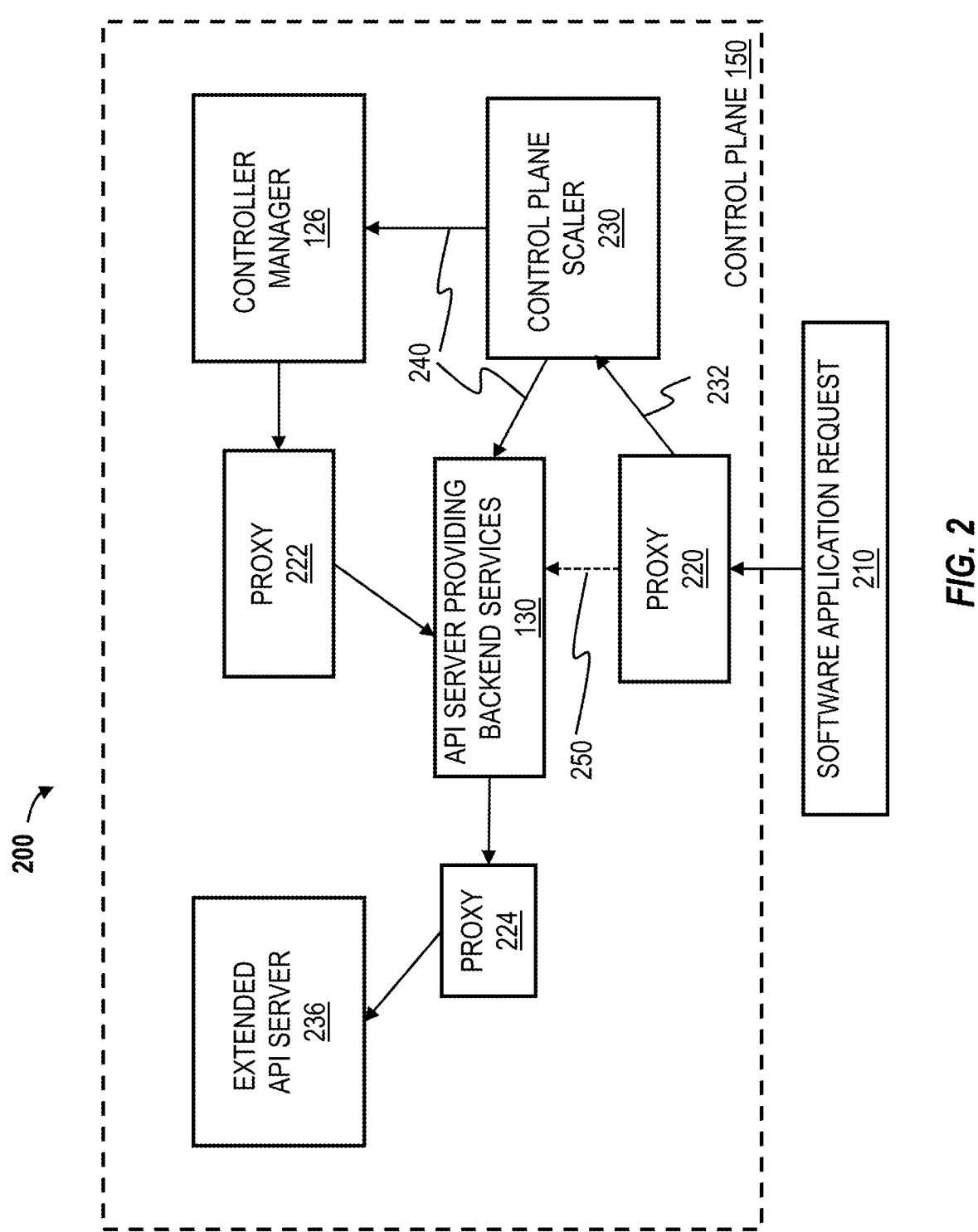
FIG. 2 depicts a schematic diagram illustrating example proxies and a control plane scaler for managing one or more control plane components according to one or more embodiments of the present invention.

FIG. 2 is a schematic diagram 200 illustrating example proxies 220, 222, and 224 and a control plane scaler 230 for managing one or more control plane components, in accordance with one or more aspects of the present disclosure. As shown, the control plane 150 may receive a software application request 210 for backend services provided via the API server 130 of FIG. 1. The proxy 220 is deployed to receive and/or intercept such a request 210 and interacts with the control plane scaler 230 to manage resource allocations in the API server 130 (or other control plane components). For example, the proxy 220 may instruct the control plane scaler 230 regarding a proper amount of resources to be assigned to the backend services (e.g., services provided by any of the control plane 150 components, such as the API server 130 and others) based on context-aware heuristics. In some cases, the control plane scaler 230 includes a vertical and/or autoscaler (e.g., with corresponding monitoring, determination, and adjustment components to change computational resources such as CPU cores, frequencies, memory, and bandwidths, and a number of replicas in horizontal scaling).

During operation, the proxy 220 may receive and intercept the request 210 from a software application. The request 210 may be for a service provided by a backend service that is one of the one or more control plane 150 components, such as the API server 130. The proxy 220 may be associated with or include a memory and a processing device coupled to the memory (see FIG. 6). The memory may include a non-transitory computer-readable storage medium in any supported format.

The processing device of the proxy 220 may determine, based on the request 210 and contexts of the request, an amount of resources to be assigned to or updated in the backend service. For example, the request may expressly include an indication of resources needed, or the processing device may determine an amount of resources based on request rates, priorities, types, and other contexts. The processing device of the proxy 220 may then cause the control plane scaler 230 to request the determined amount of resources for the backend service. For example, the proxy 220 may indicate, via a message 232, to the control plane scaler 230 to change the resource states in the API server 130 (or another component of control plane 150). The control plane scaler 230 may transmit messages 240 to the corresponding components to update the resource allocations.

Upon receiving a confirmation that the determined amount of resources is available in the backend, the proxy 220 forwards the request to the API server 130. For example, the API server 130 may respond to the message 240 with a feedback message to the control plane scaler 230. The control plane scaler 230 may then relay the feedback to the proxy 220. In some cases, however, the proxy 220 may receive a status update confirmation directly from the API server 130. For example, when the API server 130 or another component of control plane 150 is woken up from a hibernation state, the API server 130 can then send confirmation directly to the proxy 220. The proxy 220 may forward the software application request 210 to the API server 130 by message 250.

As shown in the example of FIG. 2, respective proxies, including proxy 222 and 224, may be deployed for each control plane component. For example, the proxy 222 may manage, along with the control plane scaler 230, resource allocation in the controller manager 126. The proxy 224 may manage, along with the control plane scaler 230, resource allocation in an extended API server 236.

In some cases, the proxy 220 may determine that an idle period measured based on the intercepted request has reached and determine that, based on the idle period, the amount of resources to be assigned to or updated in the backend service is zero, and cause the backend service to hibernate. For example, the idle period may be measured based on the most recent software application request, which may indicate an operation duration or an expiration time. The idle period may also be a default system or cluster time-out period. When the backend service is placed in hibernation, power and computational resources are conserved or freed up for other uses.

The proxy 220 may include an HTTP or HTTPS proxy. In some cases, in addition to the interaction with the control plane scaler 230, the proxy 220 may also operate to handle other aspects of the cluster of the control plane 150. For example, the proxy 220 may maintain identity anonymity, accelerate caching rates, facilitate network resource access, enforce access policies, enable external requests, handle security controls, and/or bypass content controls.

In addition to the illustrated API server 130, the controller manager 126, and the extended API server 236, the control plane 150 may include other control plane components in some embodiments with various components in a cluster, such as a kube-apiserver, an etcd, a kube-scheduler, and a cloud-controller-manager, etc. Such components are examples of the API server 130, persistence store 122, scheduler 128, and cloud controller manager 124 of FIG. 1.

In some cases, the proxy 220 may determine the amount of resources to be assigned to or updated in the backend service based on one or more context-aware factors or heuristics, including a rate of receiving one or more requests for the backend service, a latency of the one or more requests, a variety of types of requests of the one or more requests, and/or a priority level of the one or more requests. Examples of the context-aware factors are illustrated in FIG. 3.

Figure 3:
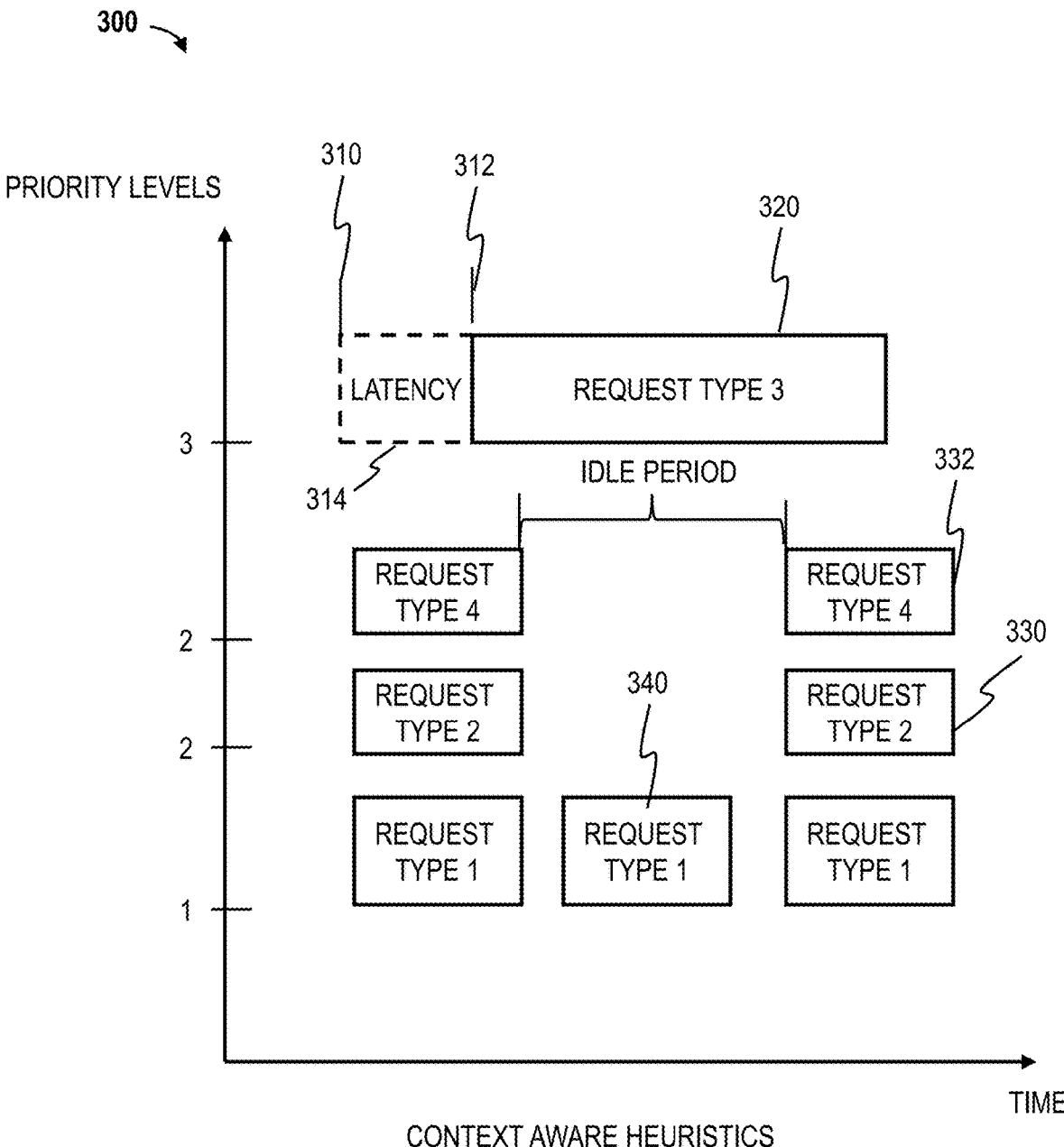
FIG. 3 depicts examples of context aware heuristics of requests in resource allocation according to one or more embodiments of the present invention.

Turning now to FIG. 3, examples 300 of context aware heuristics of requests in resource allocation are illustrated, in accordance with one or more aspects of the disclosure. As shown, at different times (the x axis), different types of requests may be received by the proxy 220 of FIG. 2. The requests may have different rates. For example, request 320 has one instance for the time period shown in FIG. 3, requests 330 and 332 have two instances in the same time period, and request 340 includes three instances in the same time period.

A higher rate of request may indicate a need for more resource allocation (when other conditions are the same). For example, when the request rate increases, the proxy 220 may determine more resources to be assigned to the backend services. The request rate may correspond to the idle period, which is between two consecutive request instances. When the second request instance has not been received for an extended period of time (e.g., the idle period exceeding a threshold), the proxy 220 may interact with the control plane scaler 230 of FIG. 2 to put related control plane components into standby modes or hibernation.

In addition to request rates, the proxy 220 may also consider request latency when determining resource allocation. As shown in FIG. 3, the request 320 may experience a latency 314 measured by a recorded initiation time 310 and a reception time 312. The initiation time 310 may be recorded by the software application when the request 210 of FIG. 2 is generated and send for the backend services. The reception time 312 may be recorded by the proxy 220 when the proxy 220 receives or intercepts the request 210. The experienced latency 314 is the difference between the reception time 312 and the initiation time 310. The proxy 220 may measure the latency 314 and can increase resource allocation when the latency 314 increases.

Furthermore, the resource allocation may be determined based on a mixture of request types, including a breakdown of "GET/PUT/UPDATE/DELETE" operations. The higher the modification ratio, the more resources should be assigned to keep up with the demand for processing. As shown in FIG. 3, at a common instant of time, three types of requests 330, 332, and 340 may be received by the proxy 220. The proxy 220 may indicate to the control plane scaler 230 to increase resource allocations accordingly.

FIG. 3 illustrates requests of different priority levels. In some cases, the proxy 220 may determine a resource allocation based on a priority level of an API. For example, APIs can have different level priorities. API requests, such as leader-elections, are usually of higher priority than other requests, such as pods queries. When the proxy 220 receives requests for a higher priority API, the proxy 220 may cause the control plane scaler 230 to increase the resource allocation in the backend services accordingly.

Figure 4:
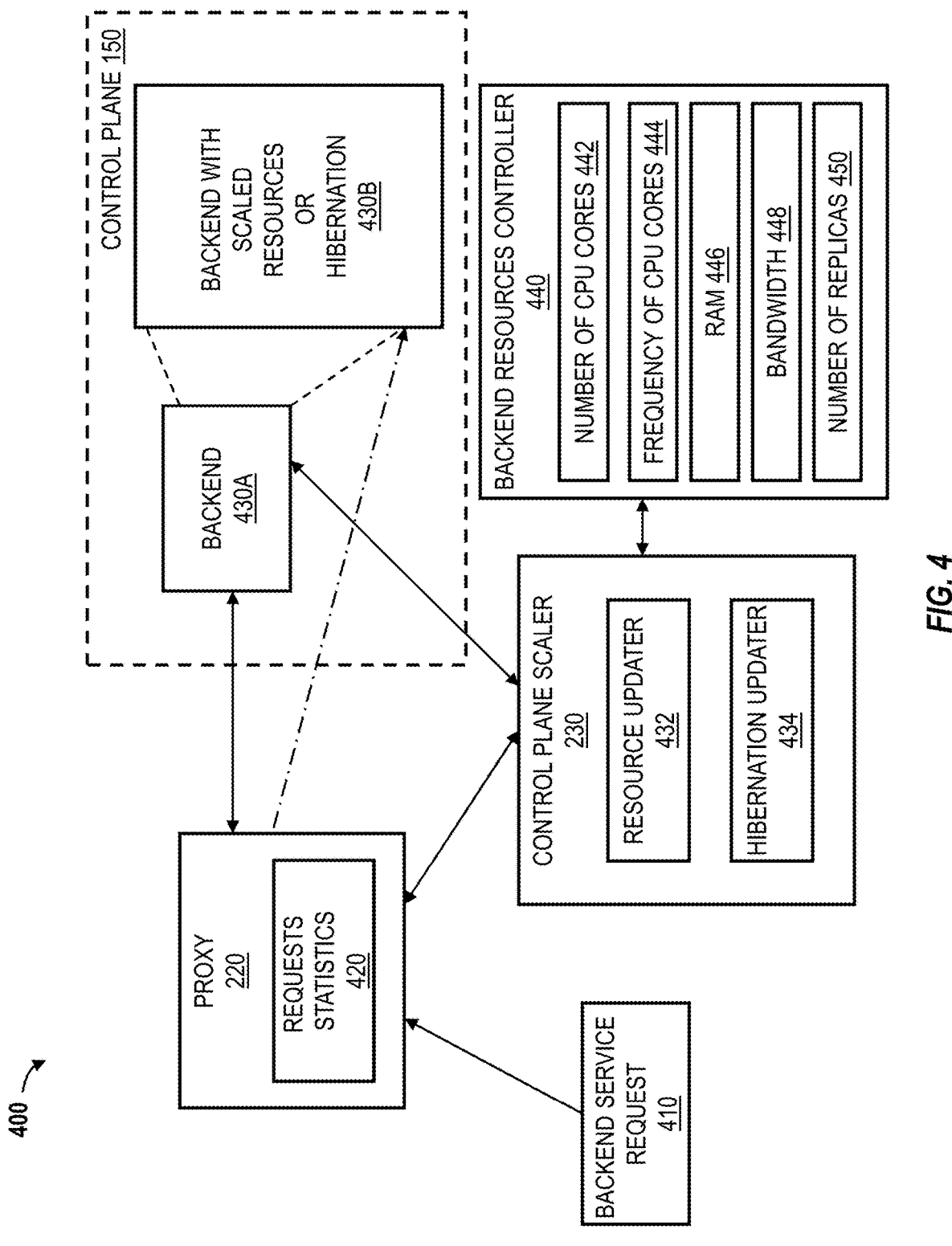
FIG. 4 depicts an example block diagram of backend service resource allocation autoscaling according to one or more embodiments of the present invention.

Turning now to FIG. 4, an example block diagram 400 of backend service resource allocation autoscaling in control plane components is shown, in accordance with one or more aspects of the disclosure. As shown, when the proxy 220 intercepts a backend service request 410, a requests statistics module 420 of the proxy 220 may evaluate the context aware heuristics as shown in FIG. 3 to determine or recommend a resource allocation for the control component that provides the requested backend service(s). The proxy 220 interacts with the control plane scaler 230 regarding the resource allocation. The control plane scaler 230 can include a resource updater 432 and a hibernation updater 434. The resource updater 432 may adjust the resource allocation with a backend resources controller 440.

The backend resources controller 440 may update one or more resources in the backend 430A, including a number of assigned CPU cores 442, a respective operating frequency 444 of each of the number of assigned CPU cores, an amount of random access memory (RAM) 446, a bandwidth 448 for communication (e.g., a network bandwidth), and/or a number of replicas 450. In some cases, the backend 430A may replicate to multiple replicas to balance the request processing (e.g., horizontal scaling).

In some cases, the backend 430A may be scaled vertically by updating the number of assigned CPU cores, the frequencies thereof, and RAM capacities. In adjusting bandwidth, the backend 430A may be apportioned with different number of antennas and software or hardware resources limiting data transfer rates. The backend 430A may be updated to the backend 430B with scaled resources to meet the demands by the backend service request 410.

The hibernation updater 434 may operate to put the backend 430A into hibernation or sleep mode when the proxy 220 does not have any expected requests incoming.

FIG. 5 is a flow diagram of a method 500 of managing resource allocation in one or more control plane components, in accordance with one or more aspects of the disclosure. The method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 can be performed by the proxy 160 of FIG. 1, or the proxy 220 of FIGS. 2 and 4 (along or together with the control plane scaler 230). Accordingly, FIG. 5 is described with reference to FIGS. 1-4.

With reference to FIG. 5, method 500 illustrates example functions used by various embodiments. Although specific function blocks ("blocks") are disclosed in method 500, such blocks are examples. That is, embodiments can perform various other blocks or variations of the blocks recited in method 500. The blocks in method 500 may be performed in an order different than presented, and not all of the blocks in method 500 may be performed. Further, method 500 can be expanded to include additional steps beyond those depicted in the example of FIG. 5, and one or more blocks can be combined or further subdivided.

Method 500 begins at block 510, by receiving and intercepting a request from a software application by a proxy, the request for a service provided by a backend service of one or more control plane components. For example, software application request 210 can be received and intercepted by proxy 220, where the software application request 210 can be a request for a backend service, such as backend service request 410, for one or more components of the control plane 150.

At block 520, a processing device of the proxy may determine, based on the intercepted request, an amount of resources to be assigned to or updated in the backend service. For example, a processing device executing the proxy 220 can determine an amount of resources using requests statistics module 420 of the proxy 220 to evaluate the context aware heuristics. In some cases, the processing device may determine that an idle period measured based on the intercepted request has been reached and determine, based on the idle period, the amount of resources to be assigned to or updated in the backend service is zero.

At block 530, the processing device may cause a control plane scaler, such as control plane scaler 230, coupled to the one or more control plane components to request the determined amount of resources for the backend service. For example, when the determined amount of resources is zero, the processing device may cause, via the control plane scaler 230, the backend service to hibernate. The resource updater 432 may adjust the resource allocation with a backend resources controller 440. The hibernation updater 434 can initiate hibernation or a sleep mode for components of the control plane 150.

At block 540, upon receiving a confirmation that the determined amount of resources is available in the backend service, the processing device may forward the intercepted request to the backend service from the proxy. For example, the proxy 220 can interface with the control plane scaler 230 and control plane 150. The control plane scaler 230 can pass a request to the backend resources controller 440 to update one or more resources in the backend 430A as backend 430B in control plane 150.

In some cases, the one or more control plane components are responsible for managing one or more nodes in a storage cluster. For example, the one or more control plane components may include components in a cluster 100, the one or more control plane components can be an API server 130, a persistence store 122, a scheduler 128, a controller manager 126, a cloud controller manager 124, and/or an API aggregator. The API aggregator can extend core API functionality. Examples can include a kube-apiserver, an etcd, a kube-scheduler, and/or a kube controller manager. In some cases, the proxy 160, 220, 222, 224 can be a hypertext transfer protocol (HTTP) or HTTP Secure (HTTPS) proxy.

In some cases, the processing device determines the amount of resources to be assigned to or updated in the backend service, and the amount is based on at least one of: a rate of receiving one or more requests for the backend service; a latency of the one or more requests; a variety of types of requests of the one or more requests; or a priority level of the one or more requests. The amount of resources to be assigned to or updated in the backend service may include at least one of: a number of central processing unit (CPU) cores; a respective operating frequency of the number of CPU cores; an amount of random access memory (RAM); or a network bandwidth for the backend service.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 of FIG. 6 contains an example of an environment for the execution of at least some of the computer code involved in performing the inventive methods, such as proxy 220 and control plane scaler 230 (also referred to as blocks 220, 230) for a backend service resource allocation. The computing environment 600 can include other aspects as previously described, such as proxy 160, 222, 224, and/or components of control plane 150 of FIGS. 1, 2, and 4. In addition to blocks 220, 230, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and blocks 220, 230, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in blocks 220, 230 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in blocks 220, 230 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving and intercepting a request from a software application by a proxy, the request for a service provided by a backend service of one or more control plane components;
determining, by a processing device of the proxy based on the intercepted request, an amount of resources to be assigned to or updated in the backend service;
causing, by the processing device, a control plane scaler coupled to the one or more control plane components to request the determined amount of resources for the backend service; and
upon receiving a confirmation that the determined amount of resources is available in the backend service, forwarding, by the processing device from the proxy, the intercepted request to the backend service,
wherein, in response to determining that an idle period has been reached based on the intercepted request, the processing device automatically causes the control plane scaler to transition the backend service from an active state to a hibernation state, thereby reducing power consumption and freeing up computational resources, and further causes the backend service to transition from the hibernation state to the active state upon receiving a subsequent request.

16

2. The computer-implemented method of claim 1, further comprising:
determining, by the processing device of the proxy, that an idle period has been reached, the idle period measured based on the intercepted request;
determining, based on the idle period, the amount of resources to be assigned to or updated in the backend service is zero; and
causing, by the processing device via the control plane scaler, the backend service to hibernate based on determining that the amount of resources to be assigned to or updated in the backend service is zero.

3. The computer-implemented method of claim 1, wherein the one or more control plane components are responsible for managing one or more nodes in a storage cluster.

4. The computer-implemented method of claim 1, wherein the proxy comprises a hypertext transfer protocol (HTTP) or HTTP Secure (HTTPS) proxy.

5. The computer-implemented method of claim 1, wherein the one or more control plane components comprise a plurality of components in a cluster, the components comprising one or more of an application program interface (API) server, a persistence store, a scheduler, a controller manager, a cloud-controller-manager, and an API aggregator.

6. The computer-implemented method of claim 1, wherein determining the amount of resources to be assigned to or updated in the backend service is based on at least one of:
a rate of receiving one or more requests for the backend service;
a latency of the one or more requests;
a variety of types of requests of the one or more requests; and
a priority level of the one or more requests.

7. The computer-implemented method of claim 1, wherein determining the amount of resources to be assigned to or updated in the backend service comprises determining at least one of:
a number of central processing unit (CPU) cores;
a respective operating frequency of the number of CPU cores;
an amount of random access memory (RAM); and
a network bandwidth for the backend service.

8. A system comprising:
a memory; and
a processing device coupled to the memory, the processing device configured to execute instructions to:
receive and intercept a request from a software application by a proxy, the request for a service provided by a backend service of one or more control plane components;
determine, by a processing device of the proxy based on the intercepted request, an amount of resources to be assigned to or updated in the backend service;
cause, by the processing device, a control plane scaler coupled to the one or more control plane components to request the determined amount of resources for the backend service; and
upon receiving a confirmation that the determined amount of resources is available in the backend service, forward, by the processing device from the proxy, the intercepted request to the backend service
wherein, in response to determining that an idle period has been reached based on the intercepted request, the processing device automatically causes the control plane scaler to transition the backend service from an active state to a hibernation state, thereby reducing power consumption and freeing up computational resources, and further causes the backend service to transition from the hibernation state to the active state upon receiving a subsequent request.

9. The system of claim 8, wherein the processing device and the memory are further configured to:

determine, by the processing device of the proxy, that an idle period has been reached, the idle period measured based on the intercepted request;

determine, based on the idle period, the amount of resources to be assigned to or updated in the backend service is zero; and cause, by the processing device via the control plane scaler, the backend service to hibernate based on determining that the amount of resources to be assigned to or update in the backend service is zero.

10. The system of claim 8, wherein the one or more control plane components are responsible for managing one or more nodes in a storage cluster.

11. The system of claim 8, wherein the proxy comprises a hypertext transfer protocol (HTTP) or HTTP Secure (HTTPS) proxy.

12. The system of claim 8, wherein the one or more control plane components comprise a plurality of components in a cluster, the components comprising one or more of an application program interface (API) server, a persistence store, a scheduler, a controller manager, a cloud-controller-manager, and an API aggregator.

13. The system of claim 8, wherein the processing device and the memory are configured to determine the amount of resources to be assigned to or updated in the backend service based on at least one of:

a rate of receiving one or more requests for the backend service;

a latency of the one or more requests;

a variety of types of requests of the one or more requests; and a priority level of the one or more requests.

14. The system of claim 8, wherein the processing device and the memory are configured to determine the amount of resources to be assigned to or updated in the backend service by determining at least one of:

a number of central processing unit (CPU) cores;

a respective operating frequency of the number of CPU cores;

an amount of random access memory (RAM); and a network bandwidth for the backend service.

15. A computer program product comprising a computer-readable storage medium having program instructions embodied therewith, the program instructions executable by one or more processors to cause the one or more processors to perform operations comprising:

receiving and intercepting a request from a software application by a proxy, the request for a service provided by a backend service of one or more control plane components;

determining, based on the intercepted request, an amount of resources to be assigned to or updated in the backend service;

causing a control plane scaler coupled to the one or more control plane components to request the determined amount of resources for the backend service; and upon receiving a confirmation that the determined amount of resources is available in the backend service, forwarding from the proxy, the intercepted request to the backend service, wherein, in response to determining that an idle period has been reached based on the intercepted request, the processing device automatically causes the control plane scaler to transition the backend service from an active state to a hibernation state, thereby reducing power consumption and freeing up computational resources, and further causes the backend service to transition from the hibernation state to the active state upon receiving a subsequent request.

16. The computer program product of claim 15, wherein the operations further comprise:

determining, by the proxy, that an idle period has been reached, the idle period measured based on the intercepted request;

determining, based on the idle period, the amount of resources to be assigned to or updated in the backend service is zero; and causing, via the control plane scaler, the backend service to hibernate based on determining that the amount of resources to be assigned to or updated in the backend service is zero.

17. The computer program product of claim 15, wherein the one or more control plane components are responsible for managing one or more nodes in a storage cluster.

18. The computer program product of claim 15, wherein the one or more control plane components comprise a plurality of components in a cluster, the components comprising one or more of an application program interface (API) server, a persistence store, a scheduler, a controller manager, a cloud-controller-manager, and an API aggregator.

19. The computer program product of claim 15, wherein determining the amount of resources to be assigned to or updated in the backend service is based on at least one of:

a rate of receiving one or more requests for the backend service;

a latency of the one or more requests;

a variety of types of requests of the one or more requests; and a priority level of the one or more requests.

20. The computer program product of claim 15, wherein determining the amount of resources to be assigned to or updated in the backend service is to determine at least one of:

a number of central processing unit (CPU) cores;

a respective operating frequency of the number of CPU cores;

an amount of random access memory (RAM); and a network bandwidth for the backend service.

* * * * *